(12) United States Patent
Thubert et al.

(10) Patent No.: US 7,460,547 B2
(45) Date of Patent: *Dec. 2, 2008

(54) MOBILE DIRECTOR

(75) Inventors: Pascal Thubert, La Colle sur Loup (FR); Eric Levy-Abegnoli, Nice (FR); David C. Forster, Reading (GB); Kent K. Leung, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1029 days.

This patent is subject to a terminal disclaimer.

(21) Appl. No.: 10/366,025

(22) Filed: Feb. 12, 2003

(65) Prior Publication Data

US 2004/0066760 A1    Apr. 8, 2004

Related U.S. Application Data

(63) Continuation-in-part of application No. 10/265,563, filed on Oct. 3, 2002.

(51) Int. Cl.
*H04L 12/28* (2006.01)
*H04L 12/58* (2006.01)
*G06F 15/16* (2006.01)

(52) U.S. Cl. .................................. 370/401; 709/227

(58) Field of Classification Search ............... 370/328, 370/401; 709/201–203, 238, 227
See application file for complete search history.

(56) References Cited

U.S. PATENT DOCUMENTS 6,445,922 B1 * 9/2002 Hiller et al. ................. 455/433

(Continued)

FOREIGN PATENT DOCUMENTS

WO    WO99/31853    6/1999

(Continued)

OTHER PUBLICATIONS

B. Aboba, *The Network Access Identifier*, RFC2486, Jan. 1999.

(Continued)

*Primary Examiner*—Kevin C Harper
(74) *Attorney, Agent, or Firm*—Weaver Austin Villeneuve & Sampson LLP

(57) ABSTRACT

Methods and apparatus for processing registration requests by a Home Agent supporting Mobile IP are disclosed. A registration request is received from each of a plurality of Mobile Nodes, the registration request specifying a care-of address, which may be allocated by the Foreign Agent. A binding is established between each of the plurality of Mobile Nodes and the associated care-of address, each of the plurality of Mobile Nodes being associated with one another. For instance, the plurality of Mobile Nodes may be statically or dynamically assigned the same Home Address. A tunnel is then created between the Home Agent and the care-of address for each of the plurality of Mobile Nodes, thereby enabling a server request to be distributed by the Home Agent to one of the plurality of Mobile Nodes or to a cluster of Mobile Nodes (e.g., associated with the care-of address) via the associated tunnel. For instance, a server request addressed to the Home Address may be forwarded directly to one of the Mobile Nodes assigned that Home Address. Alternatively, when an address such as the care-of address is associated with multiple Mobile Nodes, the Foreign Agent may perform a second level of dispatching such that the server request is dispatched to one of the Mobile Nodes in the cluster.

46 Claims, 7 Drawing Sheets

U.S. PATENT DOCUMENTS

| | | | |
|---|---|---|---|
| 6,567,664 | B1 | 5/2003 | Bargenwall et al. |
| 6,587,450 | B1* | 7/2003 | Pasanen .................. 370/338 |
| 6,728,536 | B1 | 4/2004 | Basilier et al. |
| 6,816,912 | B1 | 11/2004 | Borella et al. |
| 6,834,300 | B1 | 12/2004 | Barna et al. |
| 6,836,477 | B1 | 12/2004 | West, Jr. et al. |
| 6,856,624 | B2 | 2/2005 | Magret |
| 7,251,496 | B2 | 7/2007 | Thubert et al. |
| 2002/0052942 | A1* | 5/2002 | Swildens et al. ............ 709/223 |
| 2002/0091760 | A1* | 7/2002 | Rozen ..................... 709/203 |
| 2003/0031156 | A1* | 2/2003 | Omae et al. ............. 370/338 |
| 2003/0185196 | A1* | 10/2003 | Venkitaraman ............. 370/351 |
| 2003/0193912 | A1* | 10/2003 | O'Neill ................... 370/331 |
| 2004/0137888 | A1 | 7/2004 | Ohki |
| 2004/0203765 | A1 | 10/2004 | Das et al. |

FOREIGN PATENT DOCUMENTS

| | | |
|---|---|---|
| WO | WO00/31942 | 6/2000 |
| WO | WO 2004/032396 A2 | 4/2002 |
| WO | WO02/071720 | 9/2002 |
| WO | WO 02/071720 A1 | 9/2002 |

OTHER PUBLICATIONS

F. Heissenhuber, et al., *Home Agent Redundancy And Load Balancing In Mobile IPV6*, Broadband Communications, Proceeding of the International IFIP-IEEE Conference on Broadband Communications, Nov. 10, 1999.

Gustafsson, et al., Mobile IPv4 Regional Registration, *Mobile IP Working Group, Internet Draft*, Oct. 22, 2002, pp. 1-41.

Perkins, C., RFC 3220: IP Mobility Support for IPv4, *IETF RFC*, Jan. 31, 2002, pp. 1-99.

Examiner's Communication pursuant to Article 96(2) EPC dated Sep. 12, 2006, from corresponding European Patent Application No. 04 707 390.3.

International Search Report, mailed Mar. 31, 2004 from corresponding Application No. PCT/US03/31499, 7 pages.

U.S. Office Action dated Feb. 8, 2005 from corresponding U.S. Appl. No. 10/265,563, 14 pgs.

U.S. Office Action dated Aug. 25, 2005 from corresponding U.S. Appl. No. 10/265,563, 19 pgs.

U.S. Office Action dated Feb. 24, 2006 from corresponding U.S. Appl. No. 10/265,563, 21 pgs.

U.S. Office Action dated Jul. 13, 2006 from corresponding U.S. Appl. No. 10/265,563, 29 pgs.

Notice of Allowance mailed Mar. 20, 2007 and Allowed Claims from corresponding U.S. Appl. No. 10/265,563, 16 pgs.

International Search Report dated Jul. 29, 2004 from corresponding PCT Application No. PCT/US2004/002871, 7 pgs.

European Office Action dated Oct. 22, 2007 from corresponding PCT Application No. 04707390.3, 5 pages.

* cited by examiner

MOBILE DIRECTOR

RELATED APPLICATIONS

This application is a continuation-in-part of application Ser. No. 10/265,563, entitled "MOBILE DIRECTOR," by inventors Thubert et al, filed on Oct. 3, 2002, from which priority is claimed, which is incorporated by reference for all purposes.

BACKGROUND OF THE INVENTION

1. Field of the Invention

The present invention relates to Mobile IP network technology. More particularly, the present invention relates to distributing server requests among a cluster of servers that have registered as Mobile Nodes.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one node and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC 3220, "IP Mobility Support for IPv4" of the Network Working Group, C. Perkins, Ed., January 2002. Mobile IP is also described in the text "Mobile IP, The Internet Unplugged" by J. Solomon, Prentice Hall, 1998. Both of these references are incorporated herein by reference in their entireties and for all purposes.

The Mobile IP process and environment are illustrated in FIG. 1. A Mobile IP environment 100 includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R1 125. Router R1 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of the message from the correspondent node 155 are forwarded over the Internet 105 to the router R2 125 and ultimately to the home agent 115.

From the home agent's 115 mobility binding table, the home agent 115 recognizes that the mobile node 110 is no longer attached to the home network segment 135. The home agent 115 then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 strips the encapsulation and forwards the message to the mobile node 110 on the remote network segment 140. The packet forwarding mechanism implemented by the home agent 115 to the foreign agent 120 is often referred to as "tunneling."

Various systems exist that are capable of distributing server requests to a server that is selected from a group of servers. FIG. 2 is a diagram illustrating a prior art system for distributing server requests. The server selection process is typically accomplished using various metrics such as distance and/or load. One such system is the DistributedDirector, available as Cisco CSS11K content switch from Cisco Systems, Inc. In such a system, a cluster of servers 202 are each typically attached to the same Local Area Network (LAN) as the director 204 that is responsible for distributing server requests that it receives. However, such a prior art system typically requires that each server in the cluster of servers 202 be directly connected to the director 204 that dispatches server requests to the cluster of servers 202, as shown, in order for server requests to be efficiently routed. Unfortunately, such a system cannot distribute server requests to servers that are not directly connected to the director 204 responsible for dispatching those requests without significant limitations.

In view of the above, it would be desirable if a system could be developed that could enable server requests to be distributed to servers such as remotely located servers. Moreover, it would be beneficial if a system could be implemented to efficiently and effectively route server requests to servers in a Mobile IP environment.

SUMMARY OF THE INVENTION

The present invention provides methods and apparatus for dispatching server requests. This is accomplished, in part, through processing registration requests received from a set of Mobile Nodes acting as servers by a Home Agent supporting Mobile IP. Once the Mobile Nodes have registered with the Home Agent, server requests may be dispatched to any of the Mobile Nodes, thereby enabling a server request to be forwarded to a server capable of satisfying the request.

In accordance with one aspect of the invention, a Home Agent processes registration requests received from a cluster of Mobile Nodes capable of acting as servers in response to server requests. A registration request is received from each of a plurality of Mobile Nodes, the registration request specifying a care-of address. A binding is established between each of the plurality of Mobile Nodes and the associated care-of address, each of the plurality of Mobile Nodes being associated with one another. For instance, the plurality of Mobile Nodes may be statically or dynamically assigned the same Home Address. A tunnel is then created between the Home Agent and the care-of address for each of the plurality of Mobile Nodes, thereby enabling a server request to be distributed by the Home Agent to one of the plurality of Mobile Nodes via the associated tunnel. For instance, a server request addressed to the Home Address may be forwarded to one of the Mobile Nodes assigned that Home Address.

In accordance with another aspect of the invention, a server request dispatching system includes a network device supporting Mobile IP (e.g., Home Agent) adapted for establishing a binding between a plurality of Mobile Nodes and associated care-of address, the plurality of Mobile Nodes having the same Home Address. In addition, a request dispatching mechanism adapted for receiving a server request from a Correspondent Node and forwarding the server request to one of the plurality of Mobile Nodes, the server request being addressed to the Home Address associated with the plurality of Mobile Nodes. The request dispatching mechanism may be implemented by the Home Agent or a device coupled to the Home Agent.

In accordance with yet another aspect of the invention, a care-of address is allocated to each Mobile Node. Specifically, when a Mobile Node sends a registration request, a network device such as a Foreign Agent or a HMIP MAP allocates a care-of address to the Mobile Node. HMIP-MAP is defined in Castelluccia, C., Malki, K., Soliman, H. and L. Bellier, "Hierarchical MIPv6 mobility management (HMIPv6)", http://www.ietf.org/internet-drafts/draft-ietf-mobileip-hmipv-6-07.txt, October 2002, which is incorporated by reference for all purposes. For instance, the network device may ascertain whether a care-of address has been previously allocated to the Mobile Node. If a care-of address has previously been allocated to the Mobile Node, the care-of-address is provided in the registration request, which is then forwarded to the Home Agent. In this manner, a Mobile Node may be differentiated by its care-of address. Moreover, multiple Mobile Nodes may be associated with the same Foreign Agent or MAP. In accordance with yet another aspect of the invention, a dispatcher is coupled to the network device and adapted for selecting one of the Mobile Nodes to service the server request. The dispatcher may select a Mobile Node (e.g., server) according to various metrics including, but not limited to, load and proximity to the Correspondent Node. The dispatcher may be combined with the network device (e.g., Home Agent) in a single device or in a network device separate from the Home Agent.

In accordance with yet another aspect of the invention, two levels of dispatching are performed at the dispatcher/Home Agent and the Foreign Agent. More particularly, each cluster of Mobile Nodes is identified by an address such as a care-of address (the home address identifies the whole cluster of clusters. The HA sends packets to the care-of address owned by one of the Foreign Agents), which may be statically associated with the cluster or dynamically allocated (e.g., by the Foreign Agent). This address associated with the cluster will be specified in the registration request that is sent to the Home Agent. When the Home Agent subsequently receives a server request (e.g., addressed to a Home Address), the Home Agent ascertains the appropriate cluster of servers to which the server request is to be dispatched. The Home Agent then dispatches the server request to a cluster (e.g., identified by its care-of address). The Foreign Agent then dispatches the server request to one of the cluster members (e.g., associated with that care-of address). In order to support this embodiment, the Foreign Agent preferably sends only a single registration request from one of the cluster members. Thus, the Home Agent will identify only a single server with this care-of address. In addition, the Foreign Agent preferably sends a de-registration request for the cluster only after all of the cluster members have left or roamed from the Foreign Agent. In order to enable the Home Agent to dispatch a server request to a cluster of servers, the Foreign Agent preferably informs the Home Agent of the load capability of the cluster. This may be accomplished by querying the cluster members and summing the load capability of the cluster members. Thus, the Foreign Agent will not report that the capabilities of the cluster are fully utilized until the capabilities of all servers within the cluster are utilized.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

Figure 1:
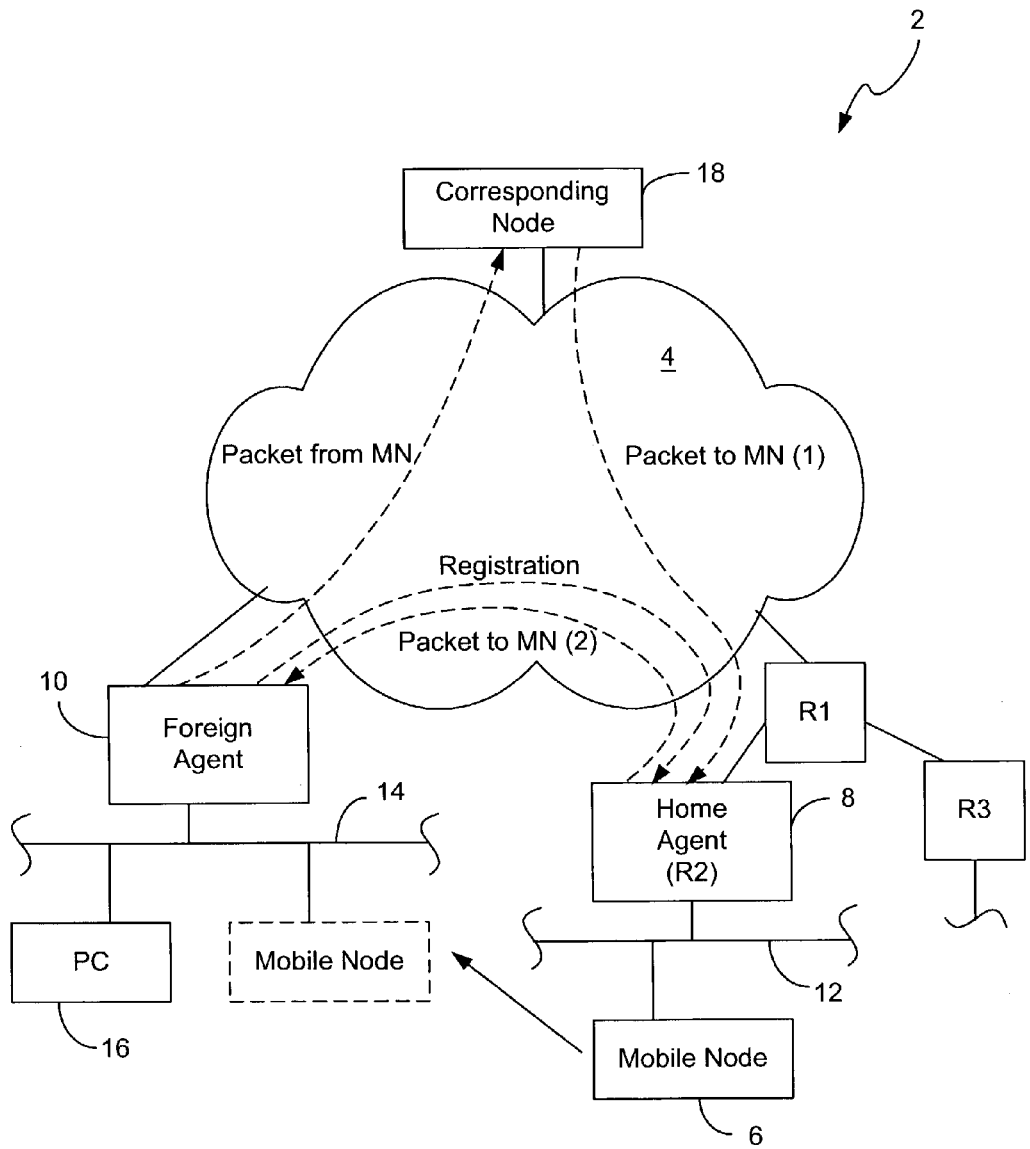
FIG. 1 is a block diagram of a Mobile IP environment.
Figure 2:
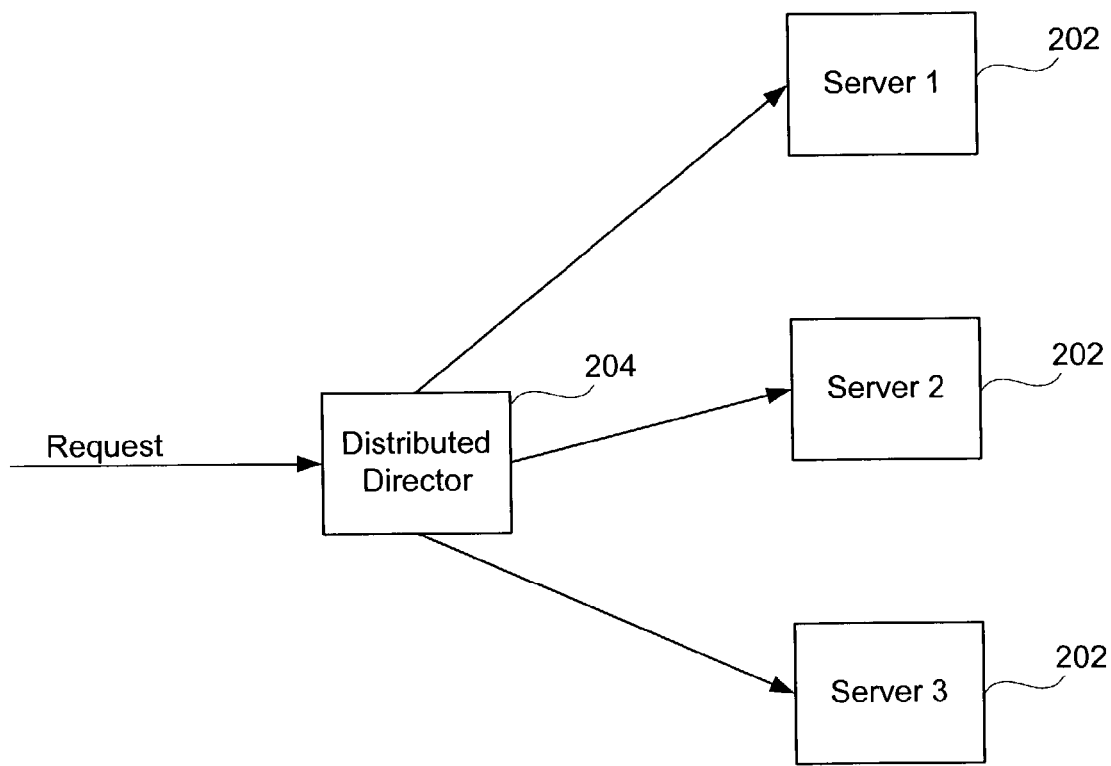
FIG. 2 is a diagram illustrating a prior art system for distributing server requests.
Figure 3:
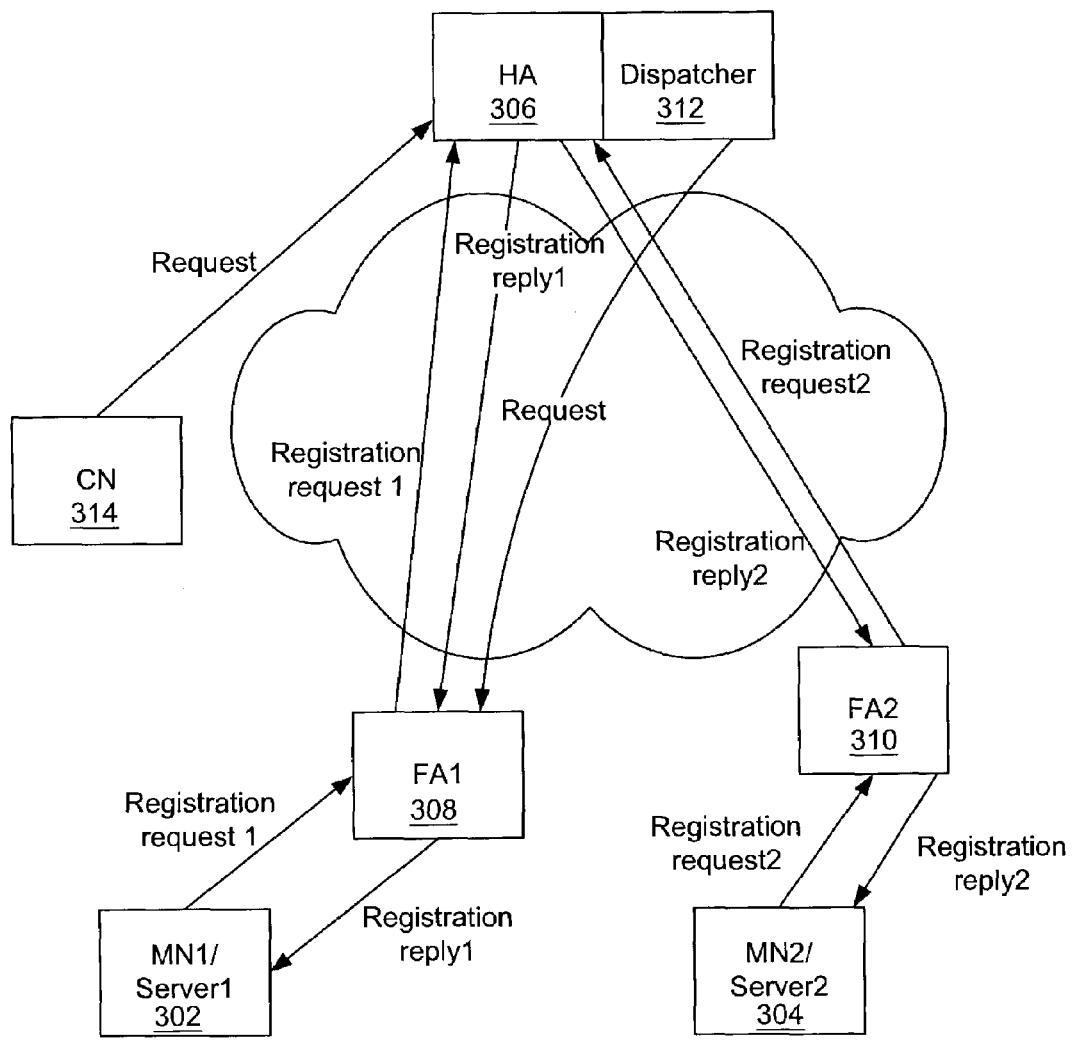
FIG. 3 is a diagram illustrating a server request dispatching system for dispatching a server request to one of a cluster of Mobile Nodes in accordance with various embodiments of the invention.

FIG. 3 is a diagram illustrating a server request dispatching system for dispatching a server request to one of a cluster of Mobile Nodes in accordance with various embodiments of the invention. The cluster of Mobile Nodes includes a plurality of Mobile Nodes that are associated with the cluster. More specifically, each of the Mobile Nodes functions as a server. For instance, the servers may support applications or functions identical to one another, and therefore the servers may provide the same functionality as the other servers. As one example, each of the servers may provide access to the same web site or web page. Alternatively, each of the servers may provide different functionality from one another.

In this example, two different Mobile Nodes, Mobile Node 1 (MN1) 302 and Mobile Node 2 (MN2) 304, register with Home Agent 306. As described above, the Mobile Nodes 302 and 304 are servers. Thus, although the servers support Mobile IP and therefore may roam within the network, they may remain stationary and therefore do not necessarily roam to another location within the network. In other words, a server may be stationary, and therefore in such an instance the server does not roam from a first Foreign Agent from which the server has registered to a second Foreign Agent. As shown in this example, each of the Mobile Nodes 302 and 304 remains connected to a different Foreign Agent, Foreign Agent 1 (FA1) 308 and Foreign Agent 2 (FA2) 310, respectively. Although the Mobile Nodes are shown connected to a Foreign Agent, the Mobile Nodes may also register with the Home Agent 306 without accessing a Foreign Agent. More specifically, in Internet Protocol version 4 (Ipv4), the Mobile Nodes may register via a Foreign Agent or a collocated care-of address. Similarly, the Mobile Nodes may register directly (without a Foreign Agent) or indirectly via a HMIP MAP in Internet Protocol version 6 (Ipv6). Thus, the present invention may be implemented in a system in which the Home Agent and the plurality of Mobile Nodes support either Ipv4 or Ipv6.

As shown, each of the Mobile Nodes 302 and 304 sends a registration request to the Home Agent 306. Similarly, the Mobile Nodes 302 and 304 receive a registration reply from the Home Agent 306 in response to the registration request. In this example, the registration request is forwarded to the Home Agent 306 via the corresponding Foreign Agent. In addition, the Foreign Agent receives the registration reply from the Home Agent, which it then forwards to the Mobile Node visiting it.

Once the server Mobile Nodes have registered with the Home Agent 306, the Home Agent and associated dispatcher 312 receive and dispatch server requests to the appropriate server(s). More specifically, a Correspondent Node 314 sends a server request (e.g., HTTP request) to the Home Agent 306. The Home Agent and associated dispatcher together select one of the Mobile Nodes in the server cluster and forward the server request to the selected Mobile Node. For instance, the dispatcher may select one of the plurality of Mobile Nodes using one or more server metrics, such as load balance information (e.g., CPU load, number of opened requests, throughput), proximity to the Correspondent Node, application requested/supported, and client-side information (e.g., QoS group, privileges) These metrics are merely exemplary and therefore other metrics typically used in server selection and known to those of ordinary skill in the art are not mentioned, but may also be used in the server selection process. In addition, the dispatcher may select a server based upon applications supported by the clustered servers. Moreover, the dispatcher may be any conventional dispatcher such as the Cisco CSS 11000 available from Cisco Systems, IBM Network Dispatcher available from IBM, and the Alteon dispatcher available from Nortel Networks.

Figure 4:
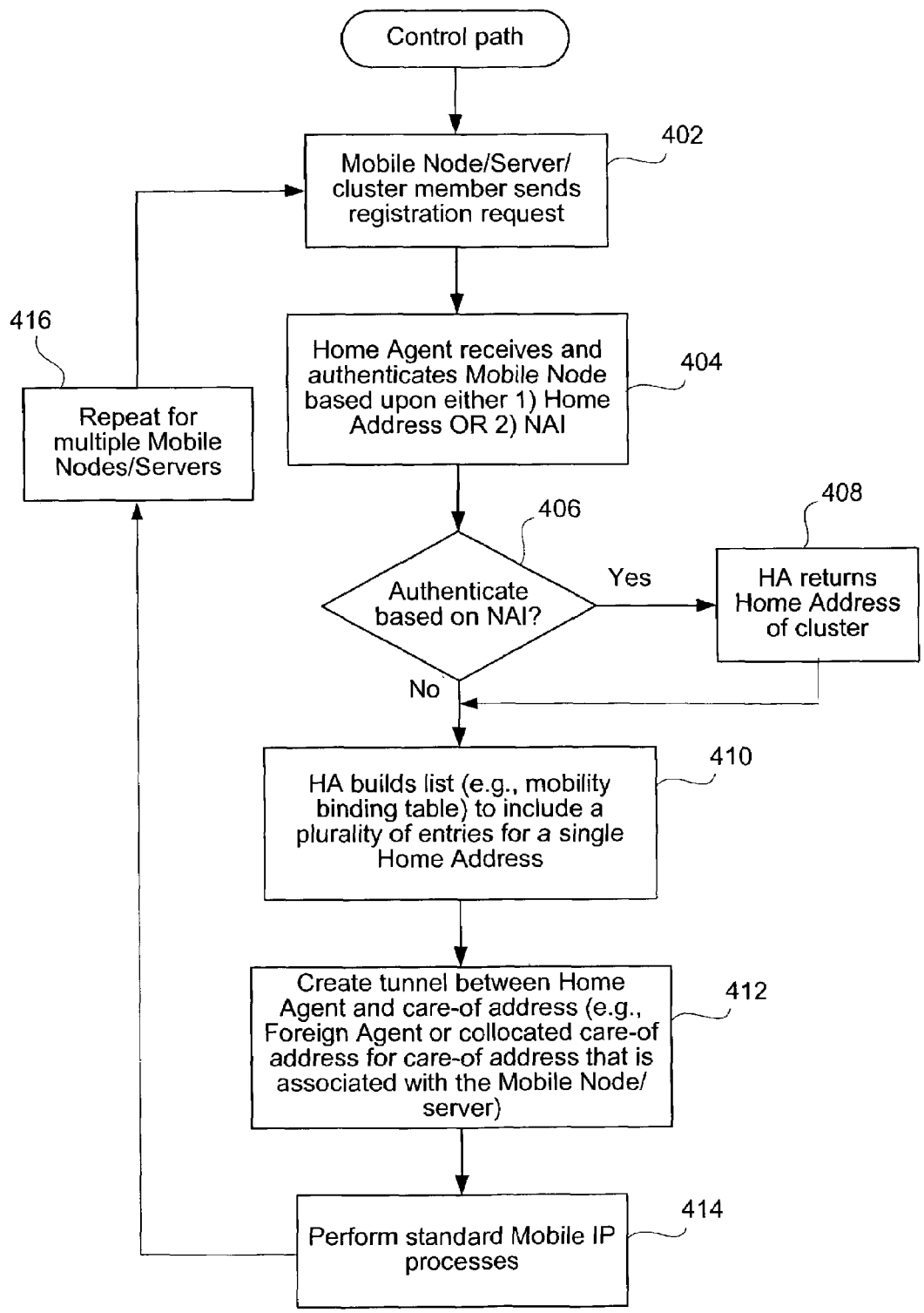
FIG. 4 is a process flow diagram illustrating a method of processing registration requests received from a cluster of Mobile Nodes such that a binding is created between the cluster of Mobile Nodes and the same Home Address in accordance with various embodiments of the invention.

FIG. 4 is a process flow diagram illustrating a method of processing registration requests received from a cluster of Mobile Nodes such that a binding is created between the cluster of Mobile Nodes and the same Home Address in accordance with various embodiments of the invention. A Mobile Node in the server cluster sends a registration request at block 402 to a Home Agent. For instance, the Mobile Node may be statically configured with the Home Agent information (e.g., Home Agent address). The registration request specifies a care-of address, which may be the care-of address of a Foreign Agent or a collocated care-of address. The registration request further includes a Home Address associated with the plurality of Mobile Nodes or a Network Access Identifier (NAI). The Home Agent then authenticates the Mobile Node based upon either the Home Address or the NAI at block 404.

One standardized method for identifying users is proposed in RFC 2486 of the Network Working Group, January 1999, hereby incorporated by reference, which proposes syntax for the NAI, the userID submitted by a client during Point to Point Protocol (PPP) authentication. For instance, the mobile node may be configured with a NAI such as mnl@cisco.com. Thus, when a client is authenticated based upon the NAI, an IP address (i.e., Home Address) may be allocated for use by the client.

The clustered Mobile Nodes are associated with one another. Specifically, in accordance with various embodiments, each of the plurality of Mobile Nodes has the same Home Address. In accordance with a first embodiment, the cluster of Mobile Nodes are statically assigned the same Home Address, which is provided by the each of the Mobile Nodes in the registration request. In accordance with a second embodiment, each of the Mobile Nodes is dynamically assigned the same Home Address. More specifically, a Home Address associated with the cluster of servers is identified or obtained (e.g., using the NAI) and assigned to each of the clustered Mobile Nodes as shown at blocks 406 and 408.

The Home Agent also establishes a binding between the Mobile Node and the associated care-of address at block 410. Specifically, a cluster ID such as a Home Address and care-of address may be stored for the Mobile Node in a Mobility Binding Table. In this manner, a plurality of entries may be stored for a plurality of Mobile Nodes and therefore identified with a single Home Address. An exemplary Mobility Binding Table will be described in further detail below with reference to FIG. 5.

The Home Agent then creates a tunnel at block 412 between the Home Agent and the care-of address for the Mobile Node, thereby enabling a server request to be distributed by the Home Agent to the Mobile Node via the associated tunnel. The Home Agent performs additional standard Mobile IP processes at block 414, and the process is repeated for multiple Mobile Nodes in the server cluster at block 416. In this manner, a Home Agent may receive and process registration requests from a plurality of Mobile Nodes. In other words, the registration of a Mobile Node with the Home Agent is used as a mechanism to control the active subset of members of the cluster upon which the dispatching takes place. Thus, as one example, when a server is taken "off-line" for maintenance, it may de-register with the Home Agent, which removes it from the cluster. Similarly, when the server is put back "on-line," the server registers with the Home Agent again so that it may be included in the cluster, enabling it to receive server requests.

As described above, the Mobile Nodes in a cluster are servers and therefore do not typically roam to another location within the network after sending the registration request to the Home Agent. Thus, in this case, the Home Agent receives a single registration request from each of the plurality of Mobile Nodes. In other words, the Home Agent does not necessarily receive subsequent registration requests from each of the plurality of Mobile Nodes. Moreover, in the embodiment described, each of the plurality of Mobile Nodes registers with the Home Agent via a different care-of address (e.g., different Foreign Agent).

As described above with reference to FIG. 4, a single care-of address may be associated with a single Mobile Node. In other words, a care-of address may not be associated with multiple Mobile Nodes. However, it is possible that multiple Mobile Nodes may wish to register via the same Foreign Agent (in IPv4) or the same HMIP MAP (as defined in http://www.ietf.org/internet-drafts/draft-ietf-mobileip-hmipv6-07.txt). Thus, in one embodiment, the Foreign Agent or HMIP MAP maintains a pool of addresses. When a Mobile Node sends a registration request, an address may be allocated from the pool of IP addresses at block 403 (not shown) to function as a care-of address for the Mobile Node server if one has not already been allocated to the Mobile Node. The IP address of the Mobile Node is preferably configured as a loopback address rather than configured on an Ethernet interface, and therefore the IP address is preferably not advertised. However, the Foreign Agent can obtain the MAC address of the Mobile Node from the registration request in order to ascertain whether a care-of address has been allocated to the Mobile Node identified by the MAC address. If a care-of address has not previously been allocated to the Mobile Node identified by the MAC address, an IP address is allocated from the pool to function as a care-of address for the MAC address. Alternatively, if a care-of address has previously been allocated to the Mobile Node identified by the MAC address, the previously allocated care-of address is obtained. The Foreign Agent then forwards the registration request including this allocated care-of address to the Home Agent.

Figure 5:
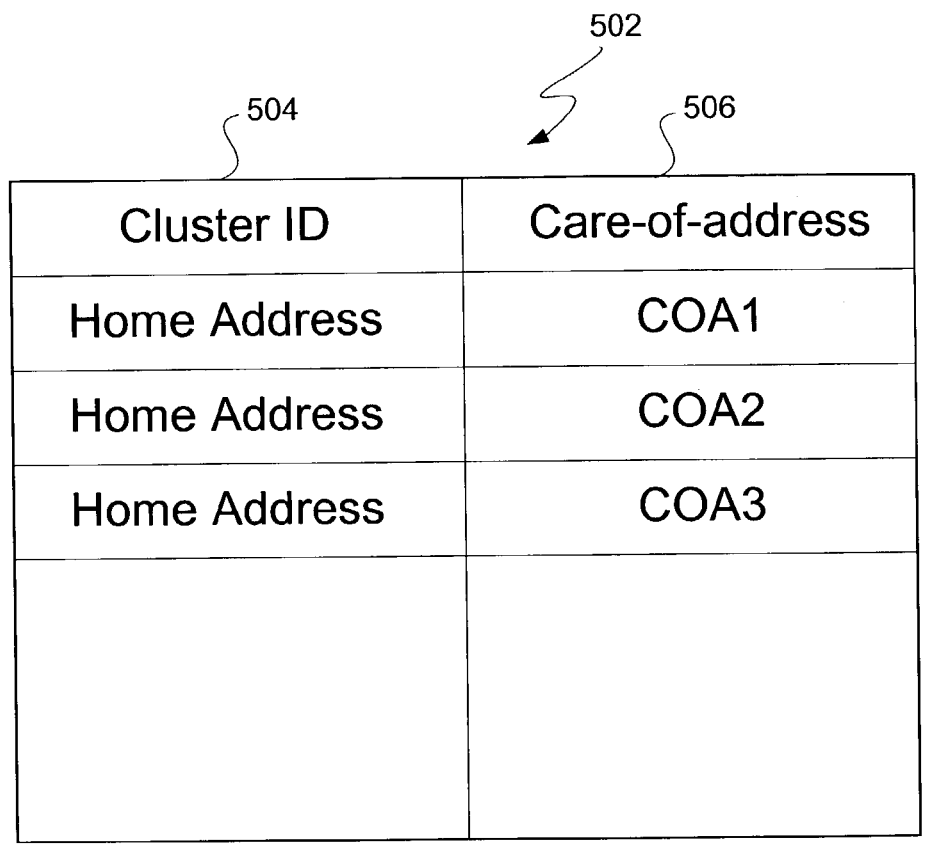
FIG. 5 is a diagram illustrating an exemplary table (e.g., Mobility Binding Table) in which bindings are stored for multiple Mobile Nodes having the same Home Address.

As described above with reference to block 410 of FIG. 4, the Home Agent builds a list such as a Mobility Binding Table that includes a plurality of entries for Mobile Nodes having the same Home Address. FIG. 5 is a diagram illustrating an exemplary table (e.g., Mobility Binding Table) 502 in which bindings are stored for multiple Mobile Nodes having the same Home Address. Specifically, in order to establish a binding between each of the plurality of Mobile Nodes and the associated care-of address, each entry identifies a cluster ID 504 (e.g., Home Address) associated with the plurality of Mobile Nodes. In addition, each entry includes the care-of address 506 associated with the corresponding Mobile Node. Therefore, the Home Agent may forward a server request to a Mobile Node identified by its care-of address when a Mobile Node is identified uniquely by its care-of address (e.g., Foreign Agent or allocated care-of address).

Figure 6:
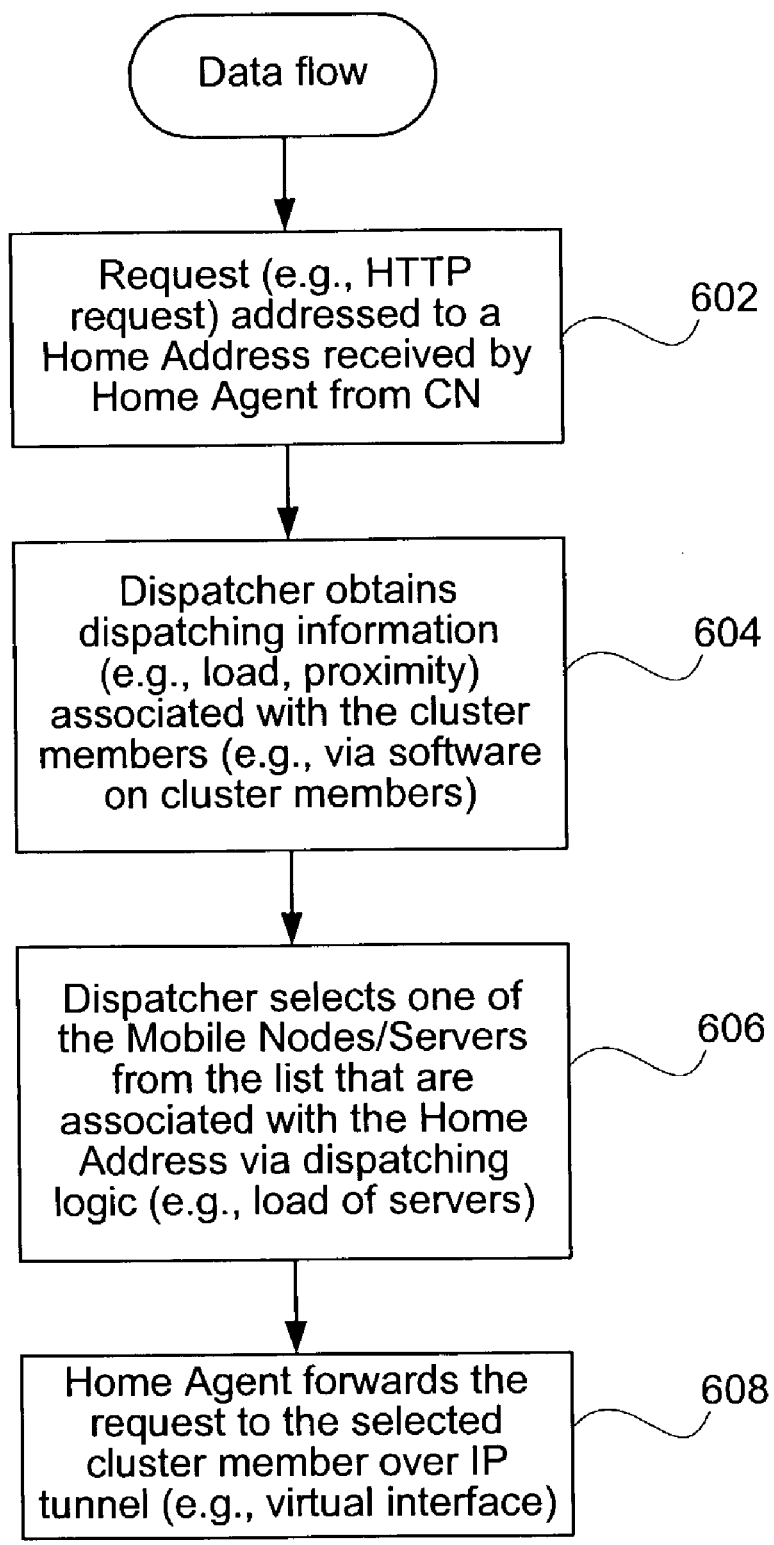
FIG. 6 is a process flow diagram illustrating a method of dispatching a server request to one of the Mobile Nodes in the cluster in accordance with various embodiments of the invention.

After the Mobile Nodes in the server cluster have registered with the Home Agent, server requests may be dispatched to one or more of the Mobile Nodes. FIG. 6 is a process flow diagram illustrating a method of dispatching a server request to one of the Mobile Nodes in the cluster in accordance with various embodiments of the invention. A request (e.g., HTTP) request addressed to a Home Address (associated with the server cluster) is sent by a Correspondent Node and received by the Home Agent at block 602. One of the Mobile Nodes is selected to service the server request prior to forwarding the server request to the selected Mobile Node. More particularly, a dispatcher obtains dispatching information associated with the cluster members at block 604. For instance, the dispatching information may include load information, information indicating proximity of the Mobile Nodes to the Correspondent Node. This information may be obtained by querying the Mobile Nodes or by receiving updates from the Mobile Nodes via software resident on the cluster members. The dispatcher selects one of the Mobile Nodes from the list (e.g., Mobility Binding Table) to service the server request according to one or more metrics such as those listed above (e.g., load, proximity) at block 606. Since the list may include entries associated with one or more server clusters, it may be necessary to ascertain which Mobile Nodes are associated with the Home Address prior to selecting one of the Mobile Nodes. Once the Mobile Node is selected, the server request is forwarded to the selected cluster member. This may be accomplished by forwarding the server request to a care-of address associated with the selected Mobile Node (e.g., obtained from the Mobility Binding Table).

Note that a Mobile Node may be multi-homed (meaning it has several Home Addresses). In addition, the Mobile Node is associated with as many care-of addresses as it belongs to clusters. In other words, for each cluster the Mobile Node belongs to, the Mobile Node is associated with an additional care-of address.

In an alternate embodiment, it is possible to associate multiple Mobile Nodes with the same care-of address (e.g., Foreign Agent or HMIP) to build a subcluster. In this embodiment, the Mobile Nodes may be distinguished by their unique Home Address and configured with a subcluster address equivalent to one or more care-of addresses. Alternatively, the Mobile Nodes may be configured with the same Home Address associated with the multiple Mobile Nodes. (As set forth above, the care-of address may be statically configured, or dynamically allocated by the Foreign Agent upon receipt of the registration request.) Alternatively, the care-of address of the Foreign Agent may serve as the cluster address for those Mobile Nodes associated with that Foreign Agent. Specifically, the cluster is identified by an address such as a care-of address in the registration request packet received by the Home Agent. Upon receipt of the server request, the dispatcher/Home Agent selects a cluster of Mobile Nodes (e.g., identified by a care-of address) at 606 rather than a specific Mobile Node/server in accordance with metrics such as those set forth above. Thus, the Home Agent maintains a list of Mobile Nodes/servers (e.g., IP addresses) in a cluster (e.g, identified by a care-of address), which is updated when registration requests and de-registration requests are received. The server request is then forwarded to the care-of address, which is intercepted by the Foreign Agent at 608, which then performs load balancing within the cluster of servers identified by the care-of address. Similar load balancing metrics as set forth above with respect to the Home Agent may be applied by the Foreign Agent to perform load balancing within the cluster associated with the Foreign Agent. In this manner, two levels of dispatching may be performed to dispatch a server request.

It is also important to note that, in accordance with one embodiment, when two or more Mobile Nodes are associated with the same care-of address, the Foreign Agent will not send more than one registration request to the Home Agent for that care-of address. In other words, when a registration request is sent from one of the Mobile Nodes in a cluster identified by a care-of address, the Foreign Agent will not forward another registration request from another cluster member to its Home Agent. Thus, the Home Agent will only have a single Mobile Node/server within a cluster identified within its list.

In addition, in accordance with one embodiment, when two or more Mobile Nodes are associated with the same care-of address, the Foreign Agent may also send a de-registration request to the Home Agent. However, the de-registration request will only be sent when all Mobile Nodes in the cluster have roamed from the Foreign Agent or are no longer associated with the Foreign Agent.

Since the Foreign Agent performs load balancing within a cluster of servers, the Foreign Agent will not report that the capabilities are fully utilized until the capabilities of all servers within the cluster are utilized. Moreover, the Foreign Agent may also track the load capabilities of the cluster, such as by querying the cluster members. The load capabilities of the cluster will be the sum of the load capabilities of each of the cluster members. The Foreign Agent may then inform the Home Agent of the load capabilities of the cluster, enabling the Home Agent to dispatch among multiple clusters of servers.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents, and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 7:
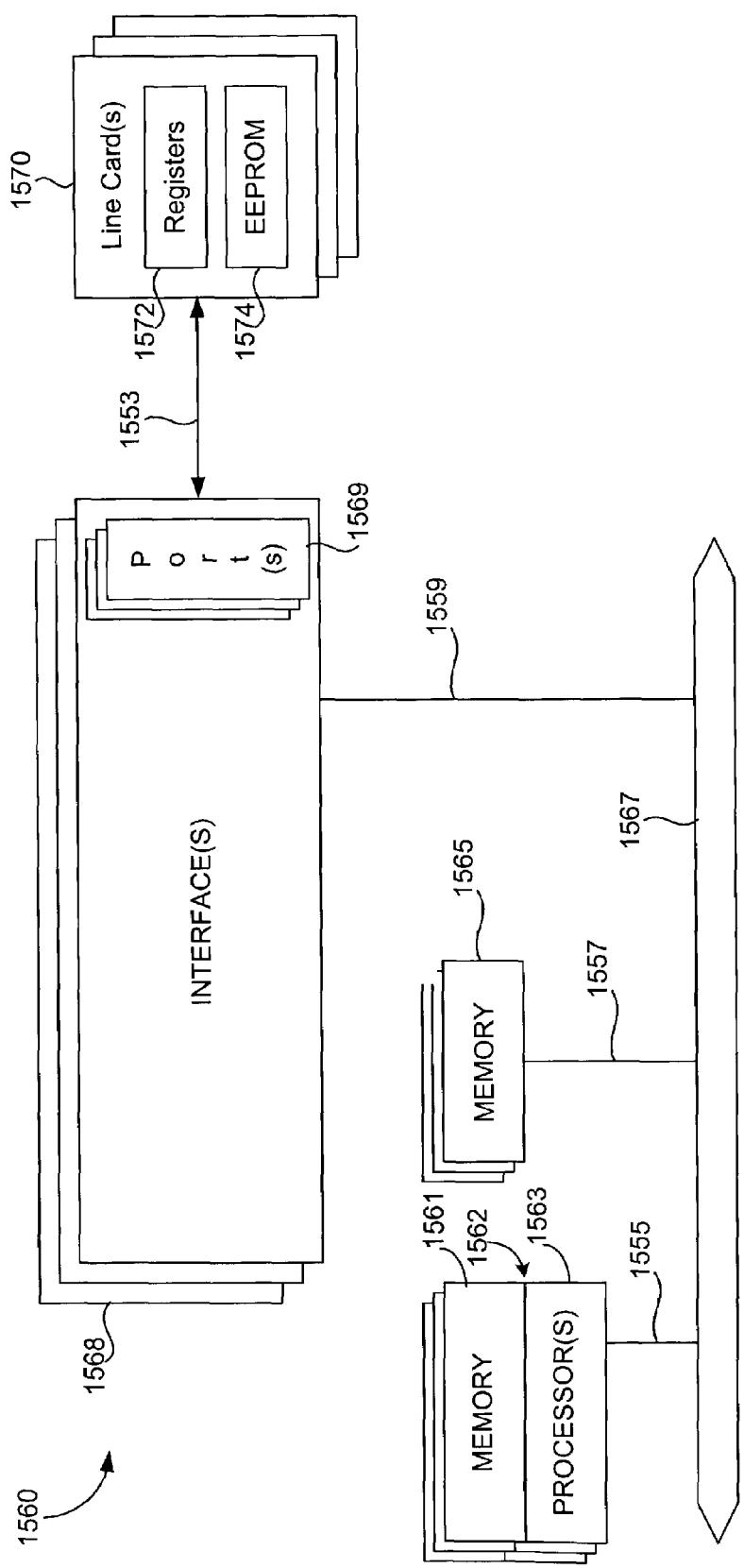
FIG. 7 is a diagram illustrating an exemplary network device in which various embodiments of the invention may be implemented.

Referring now to FIG. 7, a network device 1500 suitable for implementing the techniques of the present invention includes a master central processing unit (CPU) 1505, interfaces 1510, memory 1515 and a bus 1520. When acting under the control of appropriate software or firmware, the CPU 1505 may be responsible for implementing specific functions associated with the functions of a desired network device. For example, when configured as an intermediate router, the CPU 1505 may be responsible for analyzing packets, encapsulating packets, and forwarding packets for transmission to a set-top box. The CPU 1505 preferably accomplishes all these functions under the control of software including an operating system (e.g. Windows NT), and any appropriate applications software.

CPU 1505 may include one or more processors such as those from the Motorola family of microprocessors or the MIPS family of microprocessors. In an alternative embodiment, the processor is specially designed hardware for controlling the operations of network device 1500.

The interfaces 1510 are typically provided as interface cards (sometimes referred to as "line cards"). Generally, they control the sending and receiving of data packets over the network and sometimes support other peripherals used with the network device 1500. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 1505 to efficiently perform routing computations, network diagnostics, security functions, etc.

Although the system shown in FIG. 15 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 1515) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Moreover, although a cluster of Mobile Nodes/servers may be identified by a care-of address, alternate ways of identifying a cluster of Mobile Nodes may be implemented. Accordingly, the present embodiments are to be considered as illustrative and not restrictive, and the invention is not to be limited to the details given herein, but may be modified within the scope and equivalents of the appended claims.

What is claimed is:

1. In a network device supporting Mobile IP, a method comprising:
   receiving a registration request from a Mobile Node;
   allocating a care-of address to the Mobile Node, wherein the care-of address is assigned to a plurality of Mobile Nodes including the Mobile Node and wherein each of the plurality of Mobile Nodes are servers, wherein each of the plurality of Mobile Nodes have the same Home Address and are supported by the same Home Agent;
   forwarding the registration request including the allocated care-of address to a Home Agent associated with the Mobile Node;
   receiving a server request addressed to the care-of address;
   selecting one of the plurality of Mobile Nodes associated with the care-of address to service the server request; and
   forwarding the server request to one of the plurality of Mobile Nodes;
   wherein the network device is a Foreign Agent.

2. The method as recited in claim 1, further comprising:
   determining whether a care-of address has been allocated to the Home address of the Mobile Node;
   wherein allocating a care-of address to the Mobile Node is performed if it is determined that a care-of address has not been allocated to the Home address of the Mobile Node; and
   forwarding the registration request including the allocated care-of address to a Home Agent associated with the Home address of the Mobile Node.

3. In a Home Agent supporting Mobile IP, a method comprising:
   receiving a registration request from each of a plurality of Mobile Nodes, the registration request specifying a care-of address allocated to the corresponding Mobile Node;
   establishing a binding between each of the plurality of Mobile Nodes and the associated care-of address, each of the plurality of Mobile Nodes having the same Home Address and being supported by the Home Agent, wherein each of the plurality of Mobile Nodes are servers;
   creating a tunnel between the Home Agent and the care-of address for each of the plurality of Mobile Nodes, thereby enabling a server request to be distributed by the Home Agent to one of the plurality of Mobile Nodes via the associated tunnel;
   receiving a server request from a Correspondent Node, the server request being addressed to the Home Address associated with the plurality of Mobile Nodes;
   selecting one of the plurality of Mobile Nodes to service the server request; and
   forwarding the server request to a care-of address associated with one of the plurality of Mobile Nodes.

4. The method as recited in claim 3, wherein the care-of address is allocated to the Mobile Node by a Foreign Agent.

5. The method as recited in claim 3, wherein the care-of address is allocated to the Mobile Node by a HMIP MAP.

6. The method as recited in claim 3, wherein each of the servers supports identical applications or functions.

7. The method as recited in claim 3, wherein each of the servers provides access to the same web site or web page.

8. The method as recited in claim 3, wherein each of the servers remains connected to a different Foreign Agent.

9. The method as recited in claim 3, wherein each of the servers remains connected to the same Foreign Agent and each of the servers has a different care-of address.

10. The method as recited in claim 3, wherein each of the servers remains connected to the same HMJP and each of the servers has a different care-of address.

11. The method as recited in claim 3, wherein each of the servers does not roam to another location within the network after sending the registration request to the Home Agent.

12. The method as recited in claim 11, wherein each of the servers does not roam from a first Foreign Agent from which the server has registered to a second Foreign Agent.

13. The method as recited in claim 3, wherein the Home Agent receives a single registration request from each of the plurality of Mobile Nodes.

14. The method as recited in claim 12, wherein the Home Agent does not receive subsequent registration requests from each of the plurality of Mobile Nodes.

15. The method as recited in claim 3, wherein each of the plurality of Mobile Nodes has registered with the Home Agent from a different Foreign Agent.

16. The method as recited in claim 3, wherein the Home Agent assigns the Home Address associated with a cluster of servers including the plurality of Mobile Nodes to each of the plurality of Mobile Nodes.

17. The method as recited in claim 16, wherein the registration request includes a NAI, the method further comprising:
   obtaining the Home Address associated with the NAI.

18. The method as recited in claim 3, wherein the registration request received from each of the plurality of Mobile Nodes includes the same Home Address.

19. The method as recited in claim 3, wherein establishing a binding between each of the plurality of Mobile Nodes and the care-of address comprises:
   storing a plurality of entries in a Mobility Binding Table, each of the plurality of entries identifying a cluster ID associated with the plurality of Mobile Nodes.

20. The method as recited in claim 19, wherein the cluster ID is a single Home Address assigned to the plurality of Mobile Nodes.

21. The method as recited in claim 20, wherein each of the plurality of entries includes the care-of address associated with the corresponding Mobile Node.

22. The method as recited in claim 3, wherein the care-of address is a collocated care-of address or a Foreign Agent care-of address.

23. The method as recited in claim 3, wherein the Home Agent and the plurality of Mobile Nodes support Ipv4.

24. The method as recited in claim 3, wherein the Home Agent and the plurality of Mobile Nodes support Ipv6.

25. The method as recited in claim 3, wherein selecting one of the plurality of Mobile Nodes comprises:
   selecting one of the Mobile Nodes according to one or more metrics including at least one of load information or proximity of the Mobile Nodes to the Correspondent Node.

26. The method as recited in claim 3, wherein selecting one of the plurality of Mobile Nodes to service the server request comprises:
ascertaining the plurality of Mobile Nodes associated with the Home Address prior to selecting one of the plurality of Mobile Nodes.

27. The method as recited in claim 3, wherein forwarding the server request to one of the plurality of Mobile Nodes comprises:
forwarding the server request to a care-of address associated with the selected Mobile Node.

28. In a Home Agent supporting Mobile IP, a method comprising:
receiving a registration request from one of a plurality of Mobile Nodes, the registration request specifying a care-of address associated with the corresponding Mobile Node;
establishing a binding between each of the plurality of Mobile Nodes and the associated care-of address, each of the plurality of Mobile Nodes having the same Home Address and are supported by the Home Agent, wherein each of the plurality of Mobile Nodes are servers;
creating a tunnel between the Home Agent and the care-of address for the one of the plurality of Mobile Nodes, thereby enabling a server request to be distributed by the Home Agent to the plurality of Mobile Nodes via the associated tunnel such that the server request can be further dispatched to one of the plurality of Mobile Nodes;
receiving a server request from a Correspondent Node, the server request being addressed to the Home Address associated with the plurality of Mobile Nodes;
selecting one of the plurality of Mobile Nodes to service the server request; and
forwarding the server request to a care-of address associated with one of the plurality of Mobile Nodes.

29. The method as recited in claim 28, wherein each of the plurality of Mobile Nodes has the same care-of address.

30. In a Home Agent supporting Mobile IP, a method comprising:
receiving a first registration request from one of a first plurality of Mobile Nodes, the first registration request including a first care-of address associated with the first plurality of Mobile Nodes;
receiving a second registration request from one of a second plurality of Mobile Nodes, the second registration request including a second care-of address associated with the second plurality of Mobile Nodes;
receiving a server request from a Correspondent Node, the server request being addressed to a Home Address, wherein the Home Address and the Home Agent are associated with the first plurality of Mobile Nodes and the second plurality of Mobile Nodes, wherein each of the first plurality of Mobile Nodes and the second plurality of Mobile Nodes are servers;
ascertaining whether to forward the server request to the first plurality of Mobile Nodes or the second plurality of Mobile Nodes; and
forwarding the server request to the first care-of address associated with the first plurality of Mobile Nodes or the second care-of address associated with the second plurality of Mobile Nodes, thereby enabling a Foreign Agent to forward the server request to one of the first plurality of Mobile Nodes or one of the second plurality of Mobile Nodes.

31. The method as recited in claim 30, wherein the first care-of address is an IP address associated with a first Foreign Agent and the second care-of address is an IP address associated with a second Foreign Agent.

32. The method as recited in claim 30, wherein the first care-of address is allocated to the first plurality of Mobile Nodes by a Foreign Agent and the second care-of address is allocated to the second plurality of Mobile Nodes by a Foreign Agent.

33. The method as recited in claim 30, further comprising:
updating a list such that one of the first plurality of Mobile Nodes is associated with the first care-of address; and
updating the list such that one of the second plurality of Mobile Nodes is associated with the second care-of address.

34. The method as recited in claim 33, wherein the list does not associate the remaining ones of the first plurality of Mobile Nodes with the first care-of address or the remaining ones of the second plurality of Mobile Nodes with the second care-of address.

35. The method as recited in claim 30, further comprising:
receiving first load information for the first plurality of Mobile Nodes, the first load information indicating load capacity of the first plurality of Mobile Nodes;
receiving second load information for the second plurality of Mobile Nodes, the second load information indicating load capacity of the second plurality of Mobile Nodes; and
ascertaining from the first load information and the second load information whether to forward the server request to the first care-of address or the second care-of address.

36. The method as recited in claim 30, wherein the first care-of address is allocated to the first plurality of Mobile Nodes by a Foreign Agent and the second care-of address is allocated to the second plurality of Mobile Nodes by a Foreign Agent.

37. In a Foreign Agent, a method of dispatching a server request, comprising:
receiving a server request from a Home Agent, the server request being addressed to a Home Address, wherein the Home Address and the Home Agent are associated with each of a plurality of Mobile Nodes in a cluster of Mobile Nodes having the same care-of address, wherein each of the plurality of Mobile Nodes are servers;
selecting one of the plurality of Mobile Nodes in the cluster of Mobile Nodes; and
forwarding the server request to the selected one of the plurality of Mobile Nodes.

38. The method as recited in claim 37, further comprising:
assigning the care-of address to the plurality of Mobile Nodes prior to receiving the server request from the Home Agent.

39. The method as recited in claim 37, further comprising:
receiving a first registration request from a first one of the plurality of Mobile Nodes;
forwarding the first registration request to the Home Agent;
receiving a second registration request from a second one of the plurality of Mobile Nodes;
wherein the Foreign Agent does not forward the second registration request to the Home Agent.

40. The method as recited in claim 37, further comprising:
sending a de-registration request to the Home Agent when each of the plurality of Mobile Nodes is no longer associated with the Foreign Agent.

41. The method as recited in claim 37, further comprising:
ascertaining a load capability of each of the plurality of Mobile Nodes; and reporting to the Home Agent that the load capability of the plurality of Mobile Nodes is fully utilized when the load capability of each of the plurality of Mobile Nodes has been fully utilized.

42. The method as recited in claim 37, further comprising:
summing a load capability of each of the plurality of Mobile Nodes; and
reporting the summed load capability of the plurality of Mobile Nodes to the Home Agent.

43. The method as recited in claim 37, further comprising:
querying each of the plurality of Mobile Nodes to ascertain its load capability; and
reporting a load capability of the plurality of Mobile Nodes as a group to the Home Agent.

44. A computer-readable medium storing thereon computer readable instructions for processing a registration request in a Foreign Agent supporting Mobile IP, comprising:
instructions for allocating a care-of address to a Mobile Node from which a registration request has been received, wherein the care-of address is assigned to a plurality of Mobile Nodes including the Mobile Node and wherein each of the plurality of Mobile Nodes are servers, wherein each of the plurality of Mobile Nodes share the same Home Address and are supported by the same Home Agent;
instructions for forwarding the registration request including the allocated care-of address to a Home Agent associated with the Mobile Node;
instructions for receiving a server request addressed to the care-of address;
instructions for selecting one of the plurality of Mobile Nodes associated with the care-of address to service the server request; and
instructions for forwarding the server request to one of the plurality of Mobile Nodes.

45. A Foreign Agent supporting Mobile IP, comprising:
a processor; and
a memory, at least one of the processor or the memory being adapted for;
receiving a registration request from a Mobile Node;
allocating a care-of address to the Mobile Node;
forwarding the registration request including the allocated care-of address to a Home Agent associated with the Mobile Node, wherein the care-of address is assigned to a plurality of Mobile Nodes including the Mobile Node and wherein each of the plurality of Mobile Nodes are servers, wherein each of the plurality of Mobile Nodes share the same Home Address and the same Home Agent;
receiving a server request addressed to the care-of address;
selecting one of the plurality of Mobile Nodes associated with the care-of address to service the server request; and
forwarding the server request to one of the plurality of Mobile Nodes.

46. A network device supporting Mobile IP, comprising:
means for receiving a registration request from a Mobile Node;
means for allocating a care-of address to the Mobile Node;
means for forwarding the registration request including the allocated care-of address to a Home Agent associated with the Mobile Node, wherein the care-of address is assigned to a plurality of Mobile Nodes including the Mobile Node and wherein each of the plurality of Mobile Nodes are servers, wherein each of the plurality of Mobile Nodes share the same Home Address and the same Home Agent;
means for receiving a server request addressed to the care-of address:
means for selecting one of the plurality of Mobile Nodes associated with the care-of address to service the server request; and
means for forwarding the server request to one of the plurality of Mobile Nodes.

* * * * *